United States Patent [19]

Dalibard et al.

[11] 4,443,405

[45] Apr. 17, 1984

[54] LEAD-ANTIMONY ALLOYS FOR ELECTRODE SUPPORTS FOR LEAD ACCUMULATORS

[75] Inventors: Gérard Dalibard, Sevres; Nicole Viaud, Ville d'Avray, both of France

[73] Assignee: Societe Anonyme Dite Compagnie Europeene d'Accumulateurs, Paris, France

[21] Appl. No.: 393,530

[22] Filed: Jun. 30, 1982

Related U.S. Application Data

[63] Continuation of Ser. No. 168,343, Jul. 11, 1980, abandoned, which is a continuation-in-part of Ser. No. 56,937, Jul. 12, 1979, Pat. No. 4,253,871.

[30] Foreign Application Priority Data

Jun. 6, 1980 [FR] France .............................. 80 12603

[51] Int. Cl.³ ............................................. C21B 11/04
[52] U.S. Cl. .................................... 420/573; 420/567; 420/568; 420/569; 420/570; 420/571; 420/572; 429/245
[58] Field of Search ............... 420/567, 568, 569, 570, 420/571, 572, 573; 429/245

[56] References Cited

U.S. PATENT DOCUMENTS 3,008,853 11/1961 Borchers et al. ................... 420/567
3,879,217 4/1975 Peters ................................. 420/569

FOREIGN PATENT DOCUMENTS 2337708 6/1975 Fed. Rep. of Germany ...... 420/569
54-157725 12/1979 Japan .................................. 420/569
2026030 1/1980 United Kingdom ............... 420/572

Primary Examiner—M. J. Andrews
Attorney, Agent, or Firm—Kenyon & Kenyon

[57] ABSTRACT

The grain size and resistance to corrosion of lead-antimony alloys containing less than 4% of antimony and 0.005 to 0.1% copper, are improved by incorporating therein from 0.001 to 0.1% of a mixture of rare earths, preferably misch metal. The alloys may also contain up to 0.5% arsenic or up to 0.8% of tin.

6 Claims, 1 Drawing Figure

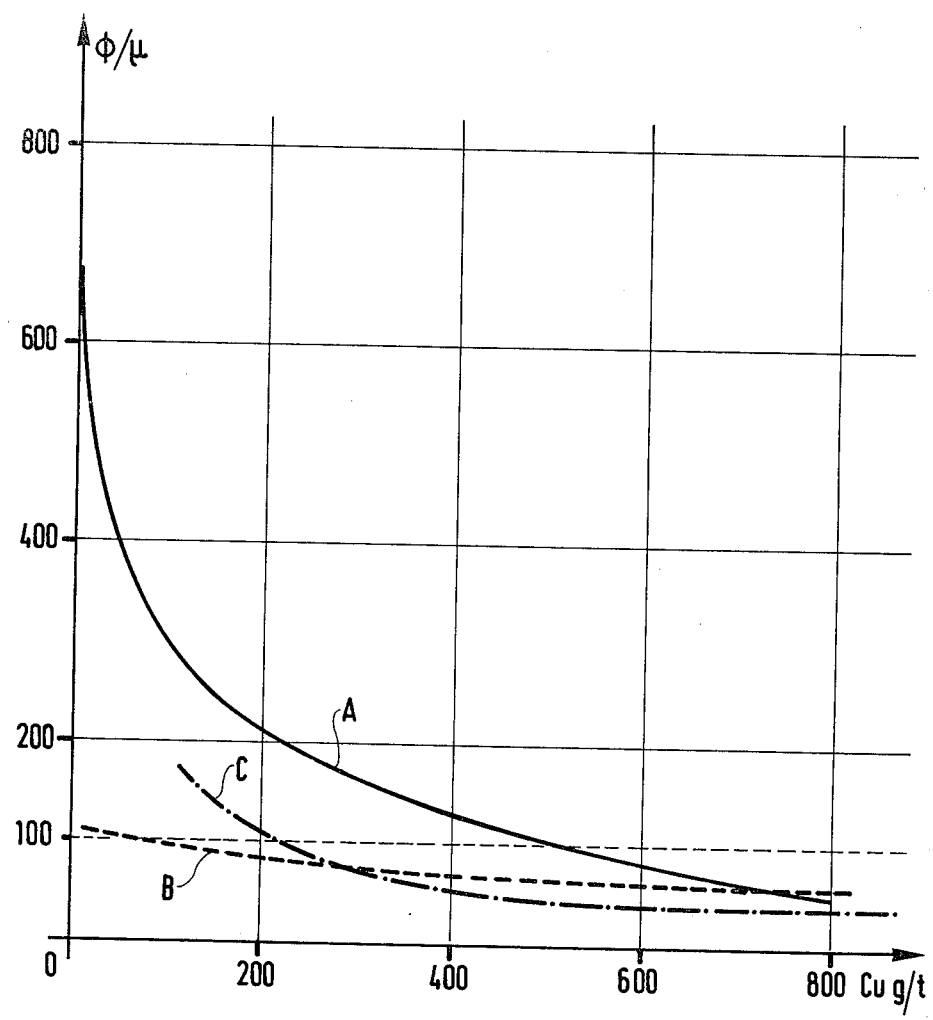

LEAD-ANTIMONY ALLOYS FOR ELECTRODE SUPPORTS FOR LEAD ACCUMULATORS

CROSS-REFERENCE TO RELATED APPLICATION

This application is a continuation of Ser. No. 06/168,343 filed on July 11, 1980 and now abandoned, which application was a continuation-in-part of Ser. No. 06/056,937 filed on July 12, 1979, now U.S. Pat. No. 4,253,871.

BACKGROUND OF THE INVENTION

The invention relates to alloys based on lead and antimony containing less than 4% by weight of antimony intended for use as supports for electrodes of lead accumulators.

It is known, particularly from Japanese Pat. No. 37-5552 filed Aug. 25, 1960 by the Furukawa Battery Co. Ltd. to introduce a rare earth, particularly cerium, into alloys to improve the fineness of the grains and thus reduce the risks of cracking of the supports. It is also known, particularly from French Pat. No. 78 21 502 filed July 20, 1978 by the Applicant, to introduce into the lead-antimony alloy not one rare earth, but a mixture of rare earths, for example misch metal, the total content of the mixture of rare earths being between 0.001 and 1%.

This characteristic has the effect that, if the electrode supports are fabricated at a temperature corresponding to the melting point of the alloy in a crucible, in order to obtain an equivalent grain size, it is necessary to work at a temperature of about 500° C. with cerium, but with misch metal one can work at a temperature on the order of 420° C.

At 420° C., in fact, it is possible to introduce into the alloy more misch metal than cerium and thus obtain a better fineness.

In other words, in order to permit the introduction of a more significant amount of cerium to obtain the same grain size as with misch metal at 420° C., it is necessary to raise the fabrication temperature of the supports.

Now any elevation of the fabrication temperature leads, on the one hand, to an increase in the consumption of energy and, on the other hand, to the risk of deterioration of the alloy by oxidation.

At 420° C., it is possible to introduce into the alloy about:
20 ppm (0.002%) of cerium, or
50 ppm (0.005%) of lanthanum, or
50 ppm (0.005%) of praseodymium or
100 ppm (0.01%) of misch metal.

At this temperature, with cerium, lanthanum and praseodymium, there is obtained an average diameter of the grains lying between 200 and 250$\mu$, whereas with misch metal, the average diameter is on the order of 130$\mu$.

SUMMARY OF THE INVENTION

According to the present invention rare earths can also be introduced into the lead-antimony alloy, comprising less than 4% by weight of antimony and 0.001 to 1% of the rare earth mixture, along with copper and optionally arsenic and tin.

Thus in the alloys according to the invention, the content of copper is between 0.005% and 0.1% or 50 g/ton (50 ppm) and 1000 g/ton (1000 ppm).

The content of arsenic is between 0 and 0.5% and that of tin between 0 and 0.8%.

It is known that in a lead-antimony alloy, optionally containing arsenic and tin, the introduction of copper permits refining the grains and especially of decreasing the intergranular corrosion.

Thus, for an alloy comprising: 1.8% antimony, 0.2% arsenic, 0.2% tin and 0.01% copper (or 100 ppm), the average diameter of the grains is about 300$\mu$.

At a fabrication temperature of the electrode supports of 420° C., it was only possible to introduce into the alloy 14 ppm of cerium, which produced an average diameter of the grains of about 220$\mu$.

On the contrary, it has been possible to introduce 100 ppm of misch metal, which produces an average diameter of the grains of about 100$\mu$.

It has been confirmed that, for a given fabrication temperature, in an alloy of lead, antimony, copper, optionally containing arsenic and tin, introduction of a rare earth permits improvement of the grain size, and when a mixture of rare earths, particularly misch metal is used, the grain size is clearly improved, because the quantity of misch metal able to be introduced into the alloy at this temperature is much greater.

In other words, in an alloy of lead, antimony, and copper, to obtain an equivalent grain size, with cerium, one would have to use a fabrication temperature for the supports on the order of 500° C., whereas with misch metal, this temperature can be on the order of 420° C.; this leads to an important economy in energy and to a decrease in corrosion of the alloy by oxidation.

The advantage of misch metal is also observed with respect to sulfur; in fact, to introduce 50 ppm of sulfur into an alloy of lead, antimony and copper, it would be necessary to use a fabrication temperature of the supports higher than 460° C.

BRIEF DESCRIPTION OF THE DRAWING

The drawing shows the relationship between the average diameter of the grains in microns to the copper content in g/ton or ppm.

DETAILED DESCRIPTION

The results according to the invention are shown on the graph in the figure relative to a lead alloy containing 1.8% antimony, 0.2% arsenic and 0.2% tin.

The content of copper in g/ton or ppm is given on the abscissa and the average diameter of the grains in microns on the ordinate.

Curve (A) relates to the introduction of copper alone.

It can be seen for example that for 200 ppm of copper, the diameter of the grains is on the order of 200$\mu$, for 400 ppm 135$\mu$ and for 600 ppm 85$\mu$.

Curve (B) concerns the introduction of copper and 100 ppm of misch metal. It can be noted that the average diameter of the grains lies around 80 to 100$\mu$, regardless of the quantity of copper added and particularly when the latter is lower than 200 ppm.

Thus, when the content of copper is about 0.01%, or 100 g/ton, in the absence of misch metal, the average diameter of the grains is about 300$\mu$, whereas it is about 100$\mu$ when 100 ppm of misch metal is added.

Curve (C) concerns the introduction of copper and 50 g/ton of sulfur. It can be noted in this case that one can only obtain results equivalent to misch metal by increasing the content of copper.

In addition, it has been noted that in a lead-antimony-copper alloy, the introduction of misch metal permits improving by 10 to 50%, according to the casting conditions, the corrosion resistance of the support in surcharging and in cycling. This corrosion resistance is measured, in a known manner, by observing the loss of weight as well as by microscopic examination of the separation of the support.

The following alloys have been tested on test bars
(a) Pb, Sb 1.8%, As 0.2%, Sn 0.2%, Cu 400 ppm
(b) Pb, Sb 1.8%, As 0.2%, Sn 0.2%, Cu 400 ppm, misch metal 93 ppm The experimental conditions were as follows:

The test bar is immersed into $H_2SO_4$, having a density d: 1.26 at 25° C., then subjected to a potential varying in saw-toothed manner from 0.6 V to 1.6 V relative to a mercury sulfate electrode, or 1.25 V to 2.25 V relative to a hydrogen electrode, at a speed of 10 mV/s.

The current is measured during the sweeping of the potential.

The corrosion of the sample is obtained by the difference between the quantity of electricity necessary to form $PbO_2$ and that corresponding to the reduction $PbO_2 \rightarrow PbSO_4$.

On the 25th cycle, for alloy (a) a corrosion of 0.19 mg/cm$^2$ was registered and for alloy (b) 0.10 mg/cm$^2$, or about 50%.

In addition, the discharge of oxygen on the 25th cycle at 1.6 V corresponds to a current of 20 mA/cm$^2$ for alloy (a), and 14 mA/cm$^2$ for alloy (b).

Misch metal is therefore advantageous both for corrosion and discharge of oxygen.

The invention of course also has as its object electrode supports constituted by the previously defined alloys, electrodes comprising such supports and lead accumulators comprising these electrodes.

We claim:

1. An alloy consisting of less than 4% of antimony, between 0.005 and 0.1% of copper, between 0.001 and 0.1% of a mixture of rare earths, between 0 and 0.5% of arsenic, and between 0 and 0.8% of tin, the balance being lead.

2. The alloy according to claim 1 in which the mixture of rare earths is misch metal.

3. The alloy according to claim 2 in which the copper content is between 0.005 and 0.02% and the content of misch metal is about 0.01%.

4. Electrode supports made of an alloy according to any one of claims 1-3.

5. Electrodes having supports according to claim 4.

6. Accumulators having electrodes according to claim 5.

* * * * *